(12) United States Patent
Okada

(10) Patent No.: US 7,293,921 B2
(45) Date of Patent: Nov. 13, 2007

(54) SINGLE FIBER BIDIRECTIONAL OPTICAL MODULE AND SINGLE FIBER BIDIRECTIONAL OPTICAL TRANSMISSION AND RECEIVER DEVICE

(75) Inventor: Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/551,852

(22) Filed: Oct. 23, 2006

(65) Prior Publication Data

US 2007/0237465 A1     Oct. 11, 2007

(30) Foreign Application Priority Data

Oct. 26, 2005   (JP) ............................. 2005-311016

(51) Int. Cl.
*G02B 6/36* (2006.01)
(52) U.S. Cl. .............................. 385/89; 385/92; 385/94
(58) Field of Classification Search ............. 385/88–94
See application file for complete search history.

(56) References Cited

U.S. PATENT DOCUMENTS

2003/0147601 A1\* 8/2003 Bartur et al. ................. 385/92
2005/0053338 A1    3/2005 Chou et al.

\* cited by examiner

*Primary Examiner*—Hemang Sanghavi
(74) *Attorney, Agent, or Firm*—Fish & Richardson P.C.

(57) ABSTRACT

A metal chassis including a laser diode (LD) and a photodiode (PD) is held at a receiver ground RG, which is the potential of the anode or the cathode of the PD. Meanwhile, a receptacle for removing an optical fiber is held at a frame ground FG of a separate frame. Lead pins of the LD are insulated from the metal chassis. The receiver ground RG and the frame ground FG are insulated from each other by an insulative member. Since the receiver ground RG is insulated from the LD and the frame, a receiver is not easily affected by inner noise and outer noise. Accordingly, a bidirectional optical module having reduced influence of forward radiated noise, LD/PD crosstalk, and the outer noise is provided.

12 Claims, 9 Drawing Sheets

SINGLE FIBER BIDIRECTIONAL OPTICAL MODULE AND SINGLE FIBER BIDIRECTIONAL OPTICAL TRANSMISSION AND RECEIVER DEVICE

BACKGROUND OF THE INVENTION

1. Field of the Invention

The present invention relates to a single-fiber bidirectional optical module including a transmitter, a receiver, and a receptacle for bidirectionally transmitting a signal through a single optical fiber. In the bidirectional optical module, the present invention particularly has objects to suppress forward radiated noise, to reduce crosstalk between a laser diode (LD) and a photodiode (PD), and to reduce outer noise.

2. Description of the Background Art

In optical communication for bidirectionally transmitting an optical signal by using a single optical fiber, an optical transmission and reception module is provided at opposite ends of the optical fiber. According to a conventional optical transmission and reception module, an optical fiber is drawn from an LD module which stores an LD in a metal package, and another optical fiber is drawn from a PD module which stores a PD in a metal package. Then, the two optical fibers are joined together by a wavelength multiplexer demultiplexer to be connected to another optical fiber. Therefore, the conventional optical transmission and reception module includes three components, i.e., the LD module, the PD module, and the wavelength multiplexer demultiplexer, which are joined to one another by the optical fibers. The module is the combination of the separate components, and has the advantages of not suffering from the LD/PD crosstalk and being resistant to the outer noise. This configuration, however, increases the number of components and makes cost reduction difficult. As a result, a bidirectional module integrating all of the components is desired.

United States Patent Application Publication No. 2005-0053338 A1 proposes an integrated optical transmission and reception module in which a receptacle, a filter, an LD, and a PD are integrated. The module is a single-fiber bidirectional module and is also an integrated module, in which the LD and the PD are positioned perpendicularly to each other and the light is distributed through the filter. In this regard, the above module is in common with the module according to the present invention, and is therefore cited herein. In the module disclosed in the above publication, a package for storing the LD, a package for storing the PD, and a rectangular box for storing the entirety of the receptacle are in contact with one another, and are all at the same potential.

A metal container storing the above components is supplied with the anode potential or the cathode potential of the LD. As a powerful driving current of the LD generates electromagnetic waves, intense radio waves are generated with the container acting as an antenna. Thereby, strong electromagnetic noise is generated in a device and equipment located in front of the container. Further, a part of the powerful driving current of the LD flows into the PD and generates noise in the PD. Therefore, electrical and electromagnetic crosstalk between the LD and the PD is increased. Furthermore, according to the above configuration, noise is frequently generated in peripheral equipment.

The optical transmission and reception module integrating the LD, the PD, and the receptacle, such as the module proposed in the above publication, involves the forward radiated noise, the LD/PD crosstalk, the outer noise, and so forth. The first object of the present invention is therefore to provide an optical module having reduced forward radiated noise caused by the driving current of the LD. Further, the second object of the present invention is to provide a bidirectional optical module having reduced LD/PD crosstalk caused by the driving current of the LD. Furthermore, the third object of the present invention is to provide a bidirectional optical module having a receiver unaffected by the outer noise.

In the optical module according to the present invention, an insulative pipe connects a metal chassis including a transmitter and a receiver to a receptacle for removing an optical fiber. Thereby, the receptacle and the chassis are insulated from each other. Further, the potential of the metal chassis including the transmitter and the receiver is set at the potential of a receiver ground RG, while the potential of the receptacle is set at the potential of a frame ground FG. That is, the two separate grounds RG and FG are provided, and the chassis including the transmitter and the receiver is connected to the receiver ground RG, while the receptacle is connected to the frame ground FG.

The transmitter includes an LD for generating transmission light. The anode and the cathode of the LD are insulated from the metal chassis. To be at the receiver ground RG is to have the same potential as the potential of either one of the anode terminal and the cathode terminal of a light receiving element, i.e., a PD or an avalanche photodiode (APD). Since the light receiving element is reverse-biased to be used, the cathode thereof can be connected to the ground, for example. Conversely, the anode can be connected to the ground. The potential shared by the mutually connected chassis and either one of the cathode terminal and the anode terminal of the receiver is referred herein as the receiver ground RG. The anode and the cathode of the LD in the transmitter are not connected to the chassis, and are held at a floating potential. If the transmitter includes a monitor photodiode (MPD), the anode and the cathode of the MPD are also held at the floating potential.

In the transmission and reception module thus including the transmitter and the receiver, a single optical fiber propagates the transmission light and the reception light in opposite directions. Therefore, the module is referred to as the "single-fiber" module. In this case, the transmission light and the reception light need to be distinguished from each other by the wavelength. Therefore, a wavelength selective filter for selecting between the transmission light and the reception light in accordance with the wavelength is obliquely provided on an extension of the optical fiber at an angle of approximately 45°. The wavelength selective filter is also provided inside the metal chassis.

The present invention relates to a receptacle-type optical module. A receptacle is a jig capable of removing an optical fiber. An optical module fixed to the leading end of an optical fiber is referred to as a pigtail-type optical module. The optical module herein discussed is the receptacle-type optical module. The optical fiber used in this case is the single optical fiber inserted in the receptacle. Thus, the present optical module is referred to as the single-fiber bidirectional optical module.

The metal chassis in this case is practically a concept including a plurality of metal containers, and refers to metal members, such as a package for storing a light emitting element, a package for storing a light receiving element, and a holder for holding a wavelength selective filter. The metals are in contact with one another, and thus are at the same potential. In the conventional module, the receptacle and the metal chassis are connected to the same ground. According to the present invention, however, the chassis and the receptacle are electrically cut off from each other by the insulative pipe. The metal chassis and the receptacle are connected to the receiver ground RG and the frame ground FG, respectively. Both grounds are at the same potential in terms of direct current and are connected to each other in the distance. However, the path connecting the two grounds is long, and thus the two grounds have different potentials due to a resistance R and an inductive component L which effectively exist.

The driving current of the LD is large and rapidly changes. In some cases, therefore, the large and rapidly changing driving current of the LD causes an adverse effect on the light receiving element and an electrical element included in a frame, directly or in the form of radio waves. If the anode or the cathode of the LD is connected to the ground of the chassis, the chassis acts as an antenna. As a result, intense radio waves of the same frequency and shape as those of an LD driving signal propagate to the surroundings to cause the crosstalk between the light receiving element and to act on the electrical element in the frame to malfunction.

SUMMARY OF THE INVENTION

According to the present invention, a chassis is connected to a receiver ground RG to reduce electrical crosstalk between a laser diode (LD) and a photodiode (PD), i.e., mixing of the driving current of the LD in the current of a light receiving element. Pins of the LD are floated from the metal chassis so that the chassis does not act as an antenna.

Further, according to the present invention, an insulative pipe formed of an insulative material such as zirconia insulates the chassis from a receptacle. Therefore, the adverse effect caused by the LD on an electrical element included in a frame can be eliminated.

If an optical module includes a single light receiving element in a receiver, the optical module can be simply expressed as LD+PD. However, the optical module does not always include a single receiver, and may include two light receiving elements. In such a case, the two light receiving elements are separately expressed as PD1 and PD2, and the optical module can be simply expressed as LD+PD1+PD2. This configuration is referred to as a triplexer. When the optical module includes the two PDs, there are two kinds of reception light and one kind of transmission light, and three wavelengths are used. In such a case, two wavelength selective filters are provided on an extension line of an optical fiber.

With reference to FIG. 1, a fundamental form of the present invention will now be described. A chassis 2 made of a metal includes a transmitter 5 for generating a transmission signal and transmitting the signal through an optical fiber, and a receiver 6 for receiving reception light transmitted through the optical fiber and performing photoelectric conversion. The chassis 2 further includes a wavelength selective filter for separating two kinds of light of different wavelengths. The potential of the metal chassis 2 is held at a receiver ground RG. Pins of the transmitter 5 are all insulated from the chassis 2 and held at a floating potential. Meanwhile, a ground pin (RG) out of pins of the receiver 6 is connected to the chassis 2. Thus, the chassis 2 is held at the receiver ground RG.

The receiver 6 includes a PD or an avalanche photodiode (APD). To avoid complication caused by repeating the two types of photodiodes, the two photodiodes are hereinafter simply represented by the PD. Either one of the anode and the cathode of the PD has to be connected to the receiver ground RG. If both terminals of the PD are not connected to the receiver ground RG, the chassis 2 is not considered to be held at the receiver ground RG. In the following description, the cathode of the PD is connected to the receiver ground RG. Alternatively, the anode of the PD can be connected to the receiver ground RG, depending on the circuit configuration of the receiver 6.

A receptacle 4 is a cylindrical member in which a ferrule provided at the leading end of an optical fiber is inserted to connect the optical fiber to an optical module. Since the optical fiber is removable from the optical module, the optical module is referred to as a receptacle-type. Meanwhile, an optical module fixed to the optical fiber is referred to as a pigtail-type. The pigtail-type optical module is provided with an optical connector disposed at the rear side thereof, through which an outer optical fiber is removable from the optical module. The present invention relates to improvement of the receptacle-type optical module. Conventionally, the receptacle is directly welded to the chassis, and thus is at the same potential as the chassis.

According to the present invention, however, a cylindrical insulative member (hereinafter referred to as the insulative pipe 8) formed of an insulative material is inserted between the receptacle 4 and the chassis 2 to insulate the receptacle 4 from the chassis 2. The insulative pipe 8 may be formed of zirconia ($ZrO_2$), for example. Zirconia is a solid ceramic and has good insulation property. The receptacle 4 is surrounded by a frame 9. The frame 9 is in contact with the receptacle 4, and thus is at the same potential as the receptacle 4. According to the present invention, two types of grounds are provided. That is, the receiver ground RG and a frame ground FG are provided for the chassis 2 and the receptacle 4, respectively.

FIG. 2 illustrates an example of an optical module including one LD and two PDs (i.e., LD+PD1+PD2). The metal chassis 2 includes the transmitter 5 (i.e., the LD), a first receiver 6, and a second receiver 7. The two receivers 6 and 7 receive different signals, such as an analog signal and a digital signal. The signals have different wavelengths. The wavelengths are different from the wavelength of the transmission light. Thus, three kinds of light of different wavelengths are used. Therefore, two wavelength selective filters are provided inside the chassis 2. The potential of the chassis 2 is equal to the potential of the receiver ground RG. That is, a ground pin RG of the first receiver 6 is connected to the chassis 2. Pins of the second receiver 7 may be all insulated from the chassis 2. Alternatively, one of the pins of the second receiver 7 may be a ground pin RG and connected to the chassis 2. The transmitter 5 includes an LD, or includes an LD and a monitor photodiode (MPD). Pins of the LD and the MPD are all insulated from the chassis 2 and held at a floating potential.

The receptacle 4 is insulated by the insulative pipe 8 from the chassis 2 including the transmitter 5 and the receivers 6 and 7. The insulative pipe 8 insulates the frame 9 and the receptacle 4 from the chassis 2. The frame 9 and the receptacle 4 are connected to the frame ground FG. This configuration has the effect of preventing the LD from acting as an antenna to generate strong electromagnetic waves, preventing the crosstalk between the LD and the PD, and cutting off the electrical element of the frame 9 from the noise caused by the LD.

FIG. 3 illustrates a more specific circuit configuration of the present invention, which corresponds to a schematic internal configuration of the LD+PD-type optical module illustrated in FIG. 1. The chassis 2, which is illustrated as a box, is not in fact box-shaped but represents the entire combination of an LD package, a PD package, a holder of the wavelength selective filter, and so forth. The present invention addresses the issue of how the ground potential is supplied. The above packages and holder are made of metal and connected to one another, and thus can be considered to form one container in terms of potential. The entirety of the above components is herein referred to as the chassis 2. The transmitter 5 includes an LD, an MPD, the packages, lead pins, and so forth.

Any of lead pins 55, 56, 57, and 58 is not connected to and is insulated from the chassis 2. The lead pins 55, 56, 57, and 58 are connected to the anode of the LD, the cathode of the LD, the anode of the MPD, and the cathode of the MPD, respectively. The cathode and the anode of the LD are not connected to the chassis 2. A case for storing the LD is connected to the chassis 2. Thus, even if the LD package has a case pin, the case pin is not connected to the LD. Since the LD and the chassis 2 are insulated from each other, it is possible to prevent the chassis 2 from acting as an antenna to radiate the driving current of the LD and diffusing noise to the surroundings.

An anode pin 69 of the PD in the receiver 6 is insulated from the chassis 2, while a cathode pin 68 is connected to the chassis 2 and serves as a case pin of the PD package, for example. Either one of the cathode and the anode of the PD may be connected to the chassis 2. The thus connected one of the cathode and the anode is connected to the receiver ground RG. Receiver grounds RG 66 and RG 67 indicate that the chassis 2 is connected to the receiver ground RG, and the chassis 2 may not be practically provided with such wiring. The connection of the cathode pin 68 to the chassis 2 is a requirement for forming the receiver ground RG. A wavelength selective filter 30 is provided inside the chassis 2 at a tilt angle of approximately 45°. The wavelength selective filter 30 causes the transmission light emitted from the LD to advance straight and enter an optical fiber 40, and reflects the reception light received from the optical fiber 40 to be incident on the PD.

The optical fiber 40 indicates an optical fiber inserted in the receptacle 4. The optical fiber 40 is removable, and thus is not always in the position illustrated in the figure. The figure illustrates the optical fiber 40 in the inserted state. The frame 9 is the entire portion including the receptacle 4 and positioned on the upper side in the figure of the insulative pipe 8. The insulative pipe 8 formed of zirconia or the like connects the chassis 2 to the receptacle 4 and the frame 9. The frame 9 and the receptacle 4 are connected to frame grounds FGs 98 and 99. The frame ground FG and the receiver ground RG are separated from each other in terms of alternate current due to the insulative pipe 8.

The receiver ground RG and the frame ground FG are grounds and thus are connected to each other in a distant part of the circuit wiring. Therefore, the frame ground FG and the receiver ground RG are equal in the average direct potential. However, the thin and long wiring line connecting the two grounds effectively includes a resistance R and an inductive component L. Thus, the resistance R and the inductive component L are symbolically shown between the FG frame ground 98 and the receiver ground RG 66. Due to the resistance R and the inductive component L, a rapid voltage change is not transmitted, and the frame ground FG and the receiver ground RG are not mutually affected by the rapid voltage change. The frame ground FG and the receiver ground RG are cut off from each other by the insulative pipe 8, and the chassis 2 is connected to the receiver ground RG. Further, the pins of the LD are floated from the chassis 2.

Due to reasons including the above, the radio waves caused by the powerful driving current (i.e., the transmission signal) of the LD do not enter the electric circuits of the PD and the frame 9 in the form of noise.

FIG. 4 similarly illustrates a configuration example of the LD+PD-type optical module of the present invention. The present example is approximately the same as the example illustrated in FIG. 3 but slightly different in the lead pins of the LD and the MPD. In FIG. 4, the anode of the LD and the cathode of the MPD are joined together and connected to a lead pin 59. This configuration can be formed in such a circuit connecting the power supply potential of the transmitter to the anode of the LD and the cathode of the MPD. With this configuration, one of the lead pins of the transmitter can be saved.

FIG. 5 illustrates an example added with another PD, i.e., an LD+PD1+PD2-type optical module. The chassis 2 includes the transmitter 5 including an LD and an MPD, the first receiver 6 including a PD1, and the second receiver 7 including a PD2. Since three different wavelengths are used, two wavelength selective filters 30 and 32 are provided on an extension line of the optical fiber 40. The transmission light emitted from the LD is transmitted through the wavelength selective filters 30 and 32, and enters the optical fiber 40. The first reception light propagated through the optical fiber 40 is reflected by the first wavelength selective filter 30 and enters the PD1. The second reception light is transmitted through the wavelength selective filter 30, reflected by the second wavelength selective filter 32, and enters the PD2.

The cathode pin 56 and the anode pin 55 of the LD are insulated from the chassis 2. The anode pin 57 and the cathode pin 58 of the MPD are also insulated from the chassis 2. The cathode pin 68 of the PD1 in the first receiver 6 is connected to the chassis 2 to be supplied with the potential of the receiver ground RG. A cathode pin 78 and an anode pin 79 of the PD2 in the second receiver 7 are insulated, i.e., floated from the chassis 2.

The frame 9 is connected to the frame grounds FGs 98 and 99. The frame ground FG and the receiver ground RG are separate grounds. The two grounds are connected to each other by a thin and long wiring line, but are separate from each other in terms of alternate current.

FIG. 6 also illustrates an example of the LD+PD1+PD2-type optical module including two receivers. The present example is in common with the example illustrated in FIG. 5 in many aspects, but is different in that the cathode pin 78 of the PD2 in the second receiver 7 is connected to the receiver ground RG of the chassis 2. Although the PD1 and the PD 2 receive different objects, the PD1 and the PD 2 can share the cathode depending on the circuit configuration, for example, in a circuit in which the power supply voltage for applying a reverse bias voltage is directly applied to the cathode. To solve the crosstalk between the light receiving elements, it is preferable to prepare the separate circuits, as illustrated in FIG. 5.

In the optical module according to the present invention, the chassis 2 including the LD and the PD is connected to the receiver ground RG, and the lead pins of the LD are insulated from the chassis 2. Further, the receptacle 4 is insulated from the chassis 2 by the insulative pipe 8, and the frame 9 including the receptacle 4 is connected to the frame ground FG. Since the pins of the LD are not connected to the chassis 2, the chassis 2 is prevented from acting as an antenna to generate the electromagnetic waves of the LD driving signal. Accordingly, the noise of the LD is not radiated to the surroundings. Further, since the receiver 6 is covered by the metal chassis 2 and connected to the receiver ground RG, the outer noise does not enter the receiver 6.

Furthermore, since the LD and the chassis 2 are insulated from each other, the electromagnetic and electrical crosstalk between the LD and the PD can be suppressed. As described above, according to the present invention, it is possible to prevent the LD from externally diffusing the noise, to reduce the crosstalk between the LD and the PD, and to suppress the mixing of the outer noise into the receiver.

The present invention can be equally applied to both the single-fiber bidirectional optical module of the LD+PD type and the single-fiber bidirectional optical module of the LD+PD+PD type (i.e., the triplexer).

DETAILED DESCRIPTION OF THE PREFERRED EMBODIMENTS

Figure 7:
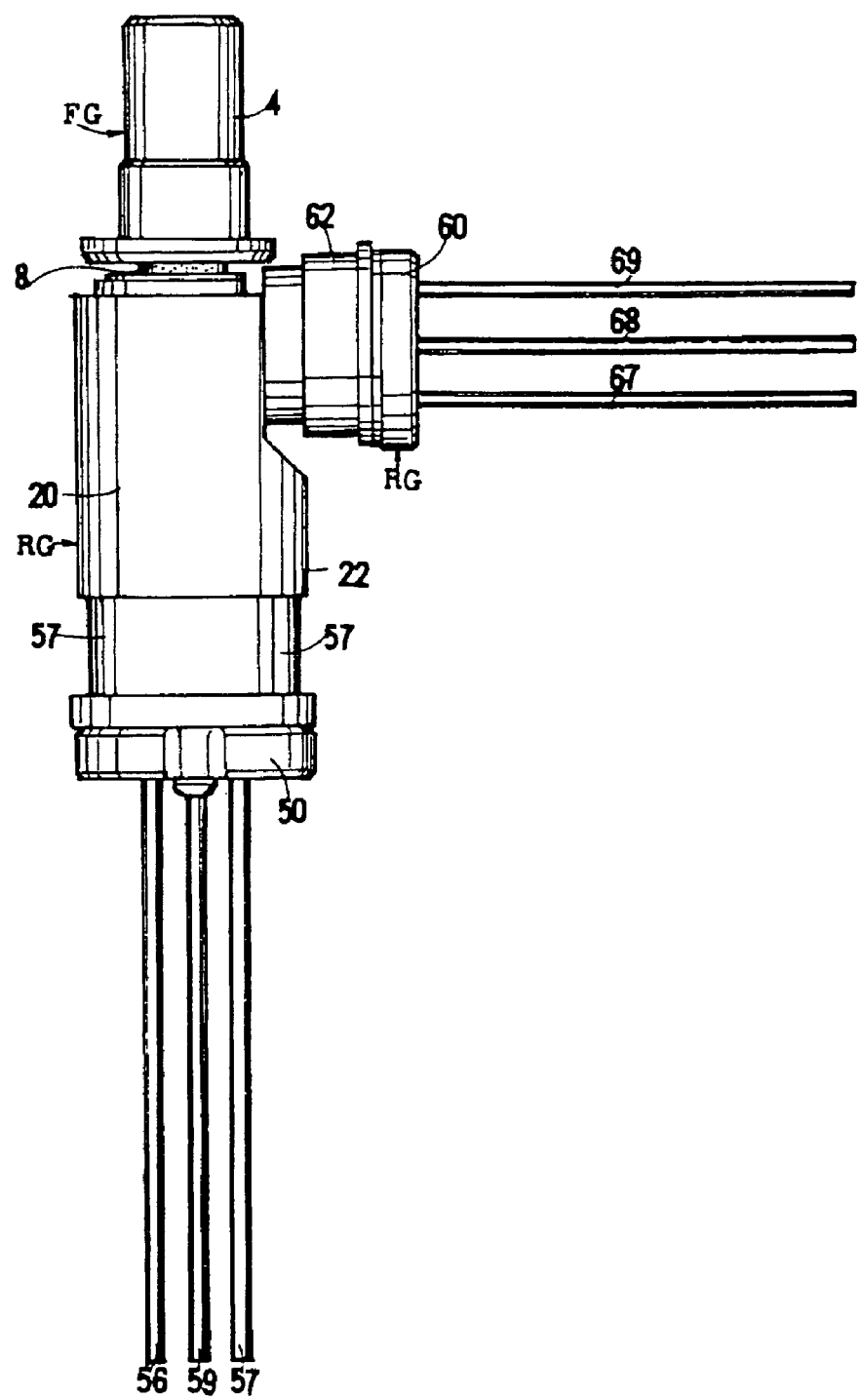
FIG. 7 is an outside front view of a receptacle-type single-fiber bidirectional optical module according to an embodiment of the present invention including one laser diode and one photodiode (i.e., LD+PD)
Figure 8:
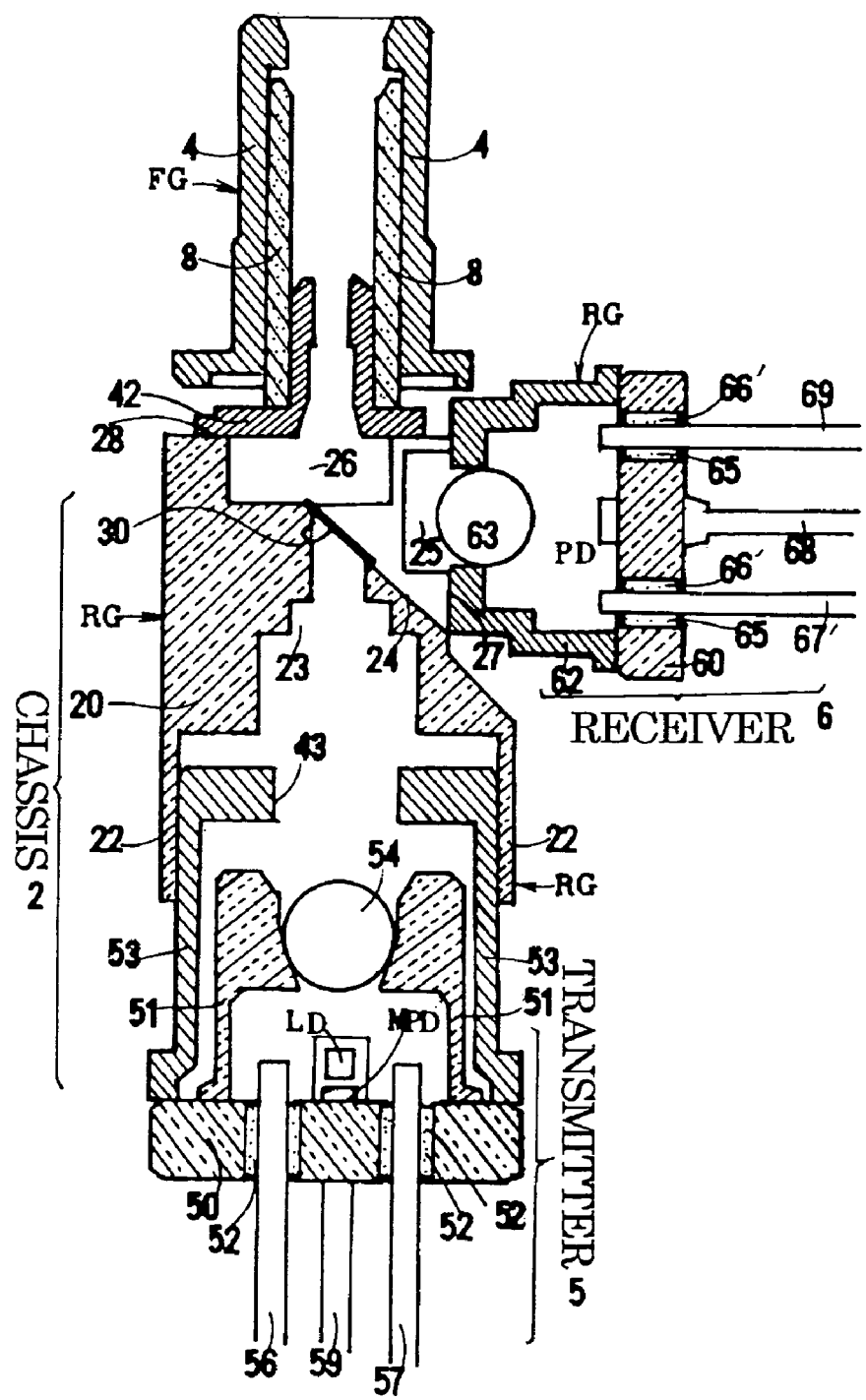
FIG. 8 is a longitudinal front view of the receptacle-type single-fiber bidirectional optical module according to the embodiment of the present invention including the laser diode and the photodiode (i.e., LD+PD)

Embodiment 1: FIG. 7 is a front view of the exterior of a bidirectional optical module according to an embodiment of the present invention. FIG. 8 is a longitudinal sectional view of the optical module. In the optical module, a transmitter 5 including a laser diode (LD) and a monitor photodiode (MPD) is provided at a lower part of the optical module, and a receiver 6 including a photodiode (PD) is provided at the right side of the optical module. Further, a receptacle 4 is provided at an upper part of the optical module, and a wavelength selective filter 30 is provided between the receptacle 4 and the transmitter 5. The figures illustrate the state in which an optical fiber 40 is not inserted in the receptacle 4. To transmit an optical signal, a ferrule provided at the leading end of the optical fiber 40 is inserted in the receptacle 4 to optically couple the optical fiber 40 to the LD and the PD.

To electrically insulate the receptacle 4 from a metal chassis 2, a cylindrical insulative pipe 8 is inserted in the receptacle 4 along the inner wall of the receptacle 4. The insulative pipe 8 is formed of a ceramic, such as zirconia (ZrO2), for example. A leading end portion of a metal inner pipe 42 is inserted in a lower internal portion of the insulative pipe 8, and a bottom portion of the metal inner pipe 42 is welded to an end surface of the chassis 2. The receptacle 4, the insulative pipe 8, and the inner pipe 42 form a concentric cylinder. The ferrule holding the leading end of the optical fiber 40 is inserted in the receptacle 4 from an opening formed at an upper portion of the receptacle 4. The leading end of the ferrule comes into contact with and stopped by the top surface of the inner pipe 42. The ferrule holds the leading end of the optical fiber 40 (see FIGS. 3 to 6).

The above-described wavelength selective filter 30 is located on an extension line of the axis line of the optical fiber 40. The LD is located at a position slightly off the extension line. Since the leading end of the optical fiber 40 has been obliquely polished, the light is slightly bent toward the obliquely polished surface. The LD is located on an extension of the thus bent light beam. The receptacle 4 and the chassis 2 are electrically cut off from each other by the insulative pipe 8. The chassis 2 and the receptacle 4 are connected to a receiver ground RG and a frame ground FG, respectively, to prevent a driving signal of the LD from being radiated forward. As well as the prevention of the forward radiation of the signal, there is an effect of suppressing crosstalk between the LD and the PD. Further, since the chassis 2 surrounding the receiver 6 is connected to the receiver ground RG, there is also an effect of protecting the receiver 6 from outer noise.

At a lower part of the chassis 2, an LD package is provided to hold the LD and the MPD. The LD package includes a disk-shaped LD stem 50, a cylindrical lens holder 51, and a cylindrical LD sleeve 53. The upper surface of the LD stem 50 is provided with a longitudinally long projection having a side surface to which the LD is fixed in the vertical direction. The LD emits forward light and backward light, and the forward light serves as transmission light. The upper surface of the LD stem 50 is provided with the MPD to receive the backward light emitted from the LD. The MPD monitors the output from the LD. If the output from the LD is reduced, the MPD complementarily increases the driving current to thereby maintain the optical output from the LD constant.

A lens 54 provided above the LD is held by the lens holder 51. The lens 54 focuses the forward light emitted from the LD on the leading end of the optical fiber 40. The cylindrical LD sleeve 53 surrounds the lens holder 51, and includes a through-hole 43 formed at an upper portion thereof. A bottom portion of the LD sleeve 53 is welded to the LD stem 50. The LD stem 50, the lens holder 51, and the LD sleeve 53 are all made of metal and in contact with one another, and thus are at the same potential.

The LD stem 50 is provided with a plurality of lead pins 56, 57, and 59. Appropriate ones of the lead pins 56, 57, and 59 are connected to the cathodes and the anodes of the LD and the MPD by wire bonding, and are electrically insulated from the LD stem 50. The lead pins 56, 57, and 59 are inserted through through-holes 52 and fixed to the through-holes 52 with a low-melting glass, for example. A case pin (i.e., a pin fixed to a stem) is unnecessary. The case pin may be provided but not connected to the anodes and the cathodes of the LD and the MPD. The LD and the LD package are electrically independent of each other. Usually, either one of the anode and the cathode of the LD is connected to the case pin. However, this connection is not preferable in that the LD package is held at the potential of the LD. According to the present invention, the anodes and the cathodes of the LD and the MPD are insulated from the LD package and held at a floating potential. This configuration is one of the characteristics of the present invention.

Figure 1:
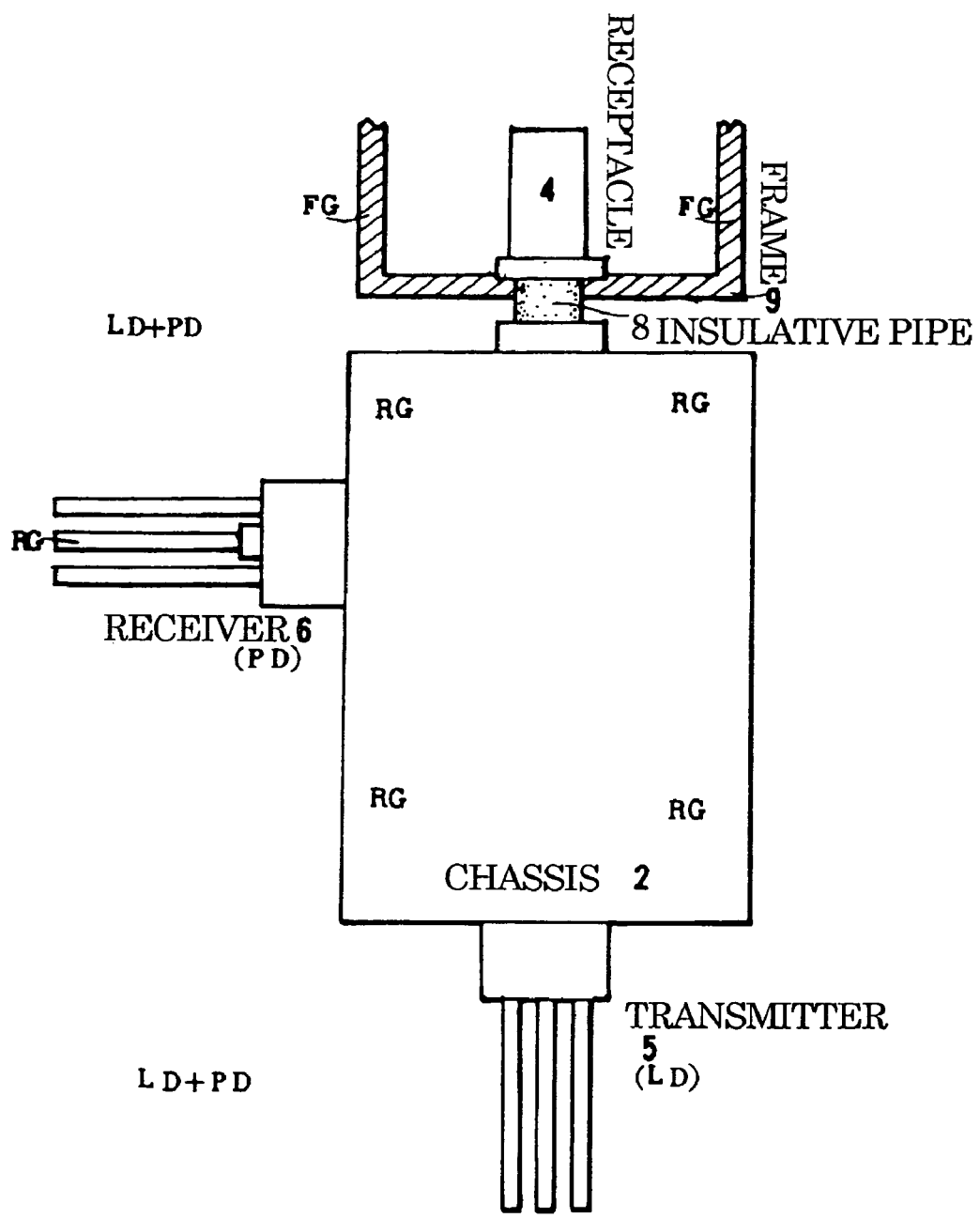
FIG. 1 is a schematic configuration diagram of a receptacle-type single-fiber bidirectional optical module according to the present invention including one laser diode and one photodiode (i.e., LD+PD)
Figure 2:
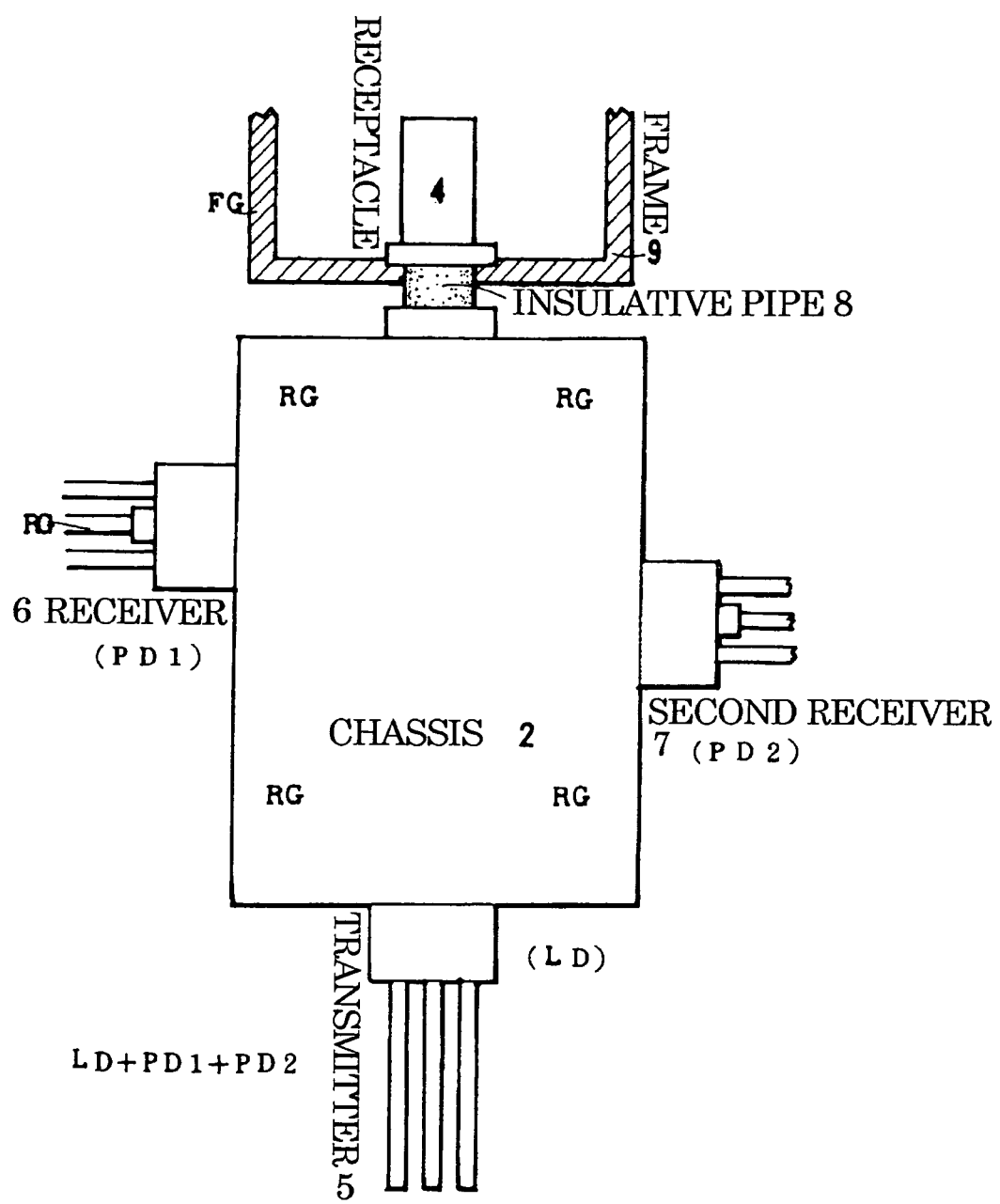
FIG. 2 is a schematic configuration diagram of a receptacle-type single-fiber bidirectional optical module according to the present invention including one laser diode and two photodiodes (i.e., LD+PD1+PD2)
Figure 3:
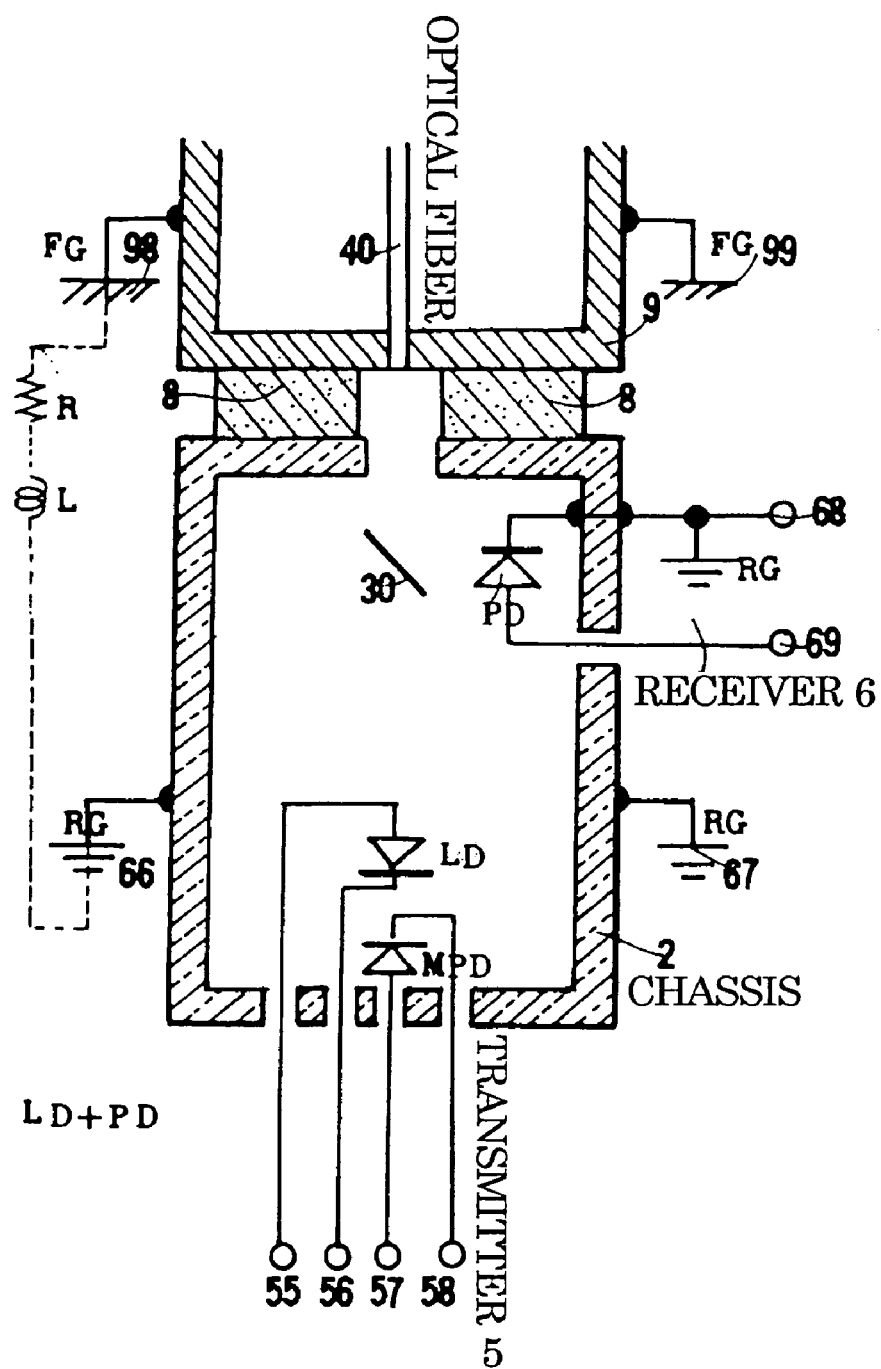
FIG. 3 is a schematic configuration diagram of the interior of a chassis of a receptacle-type single-fiber bidirectional optical module according to the present invention including one laser diode and one photodiode (i.e., LD+PD)
Figure 4:
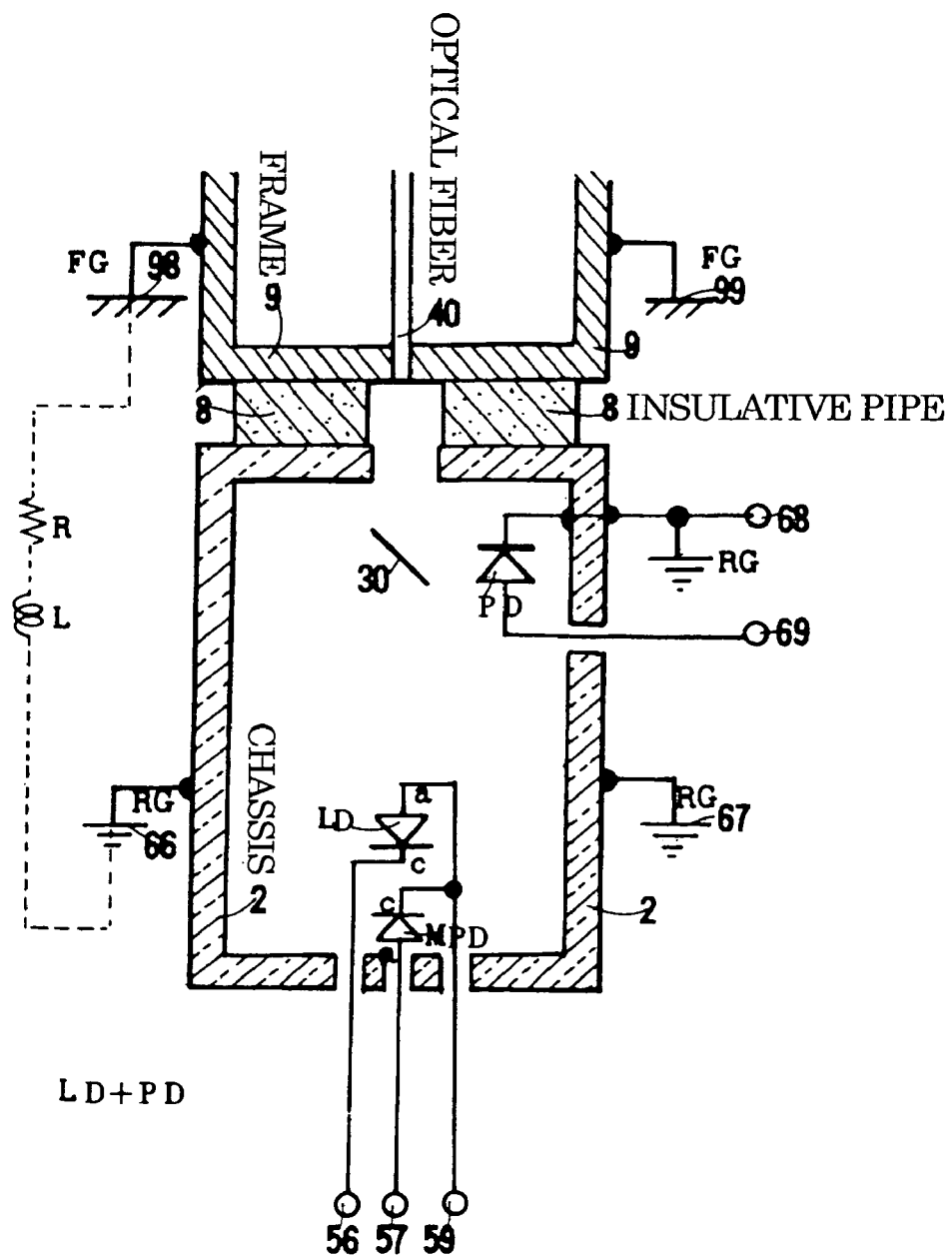
FIG. 4 is a schematic configuration diagram of the interior of a chassis of a receptacle-type single-fiber bidirectional optical module according to the present invention including one laser diode and one photodiode (i.e., LD+PD), in which a cathode pin of a monitor photodiode (MPD) for monitoring the light of the LD is shared by an anode pin of the LD.
Figure 5:
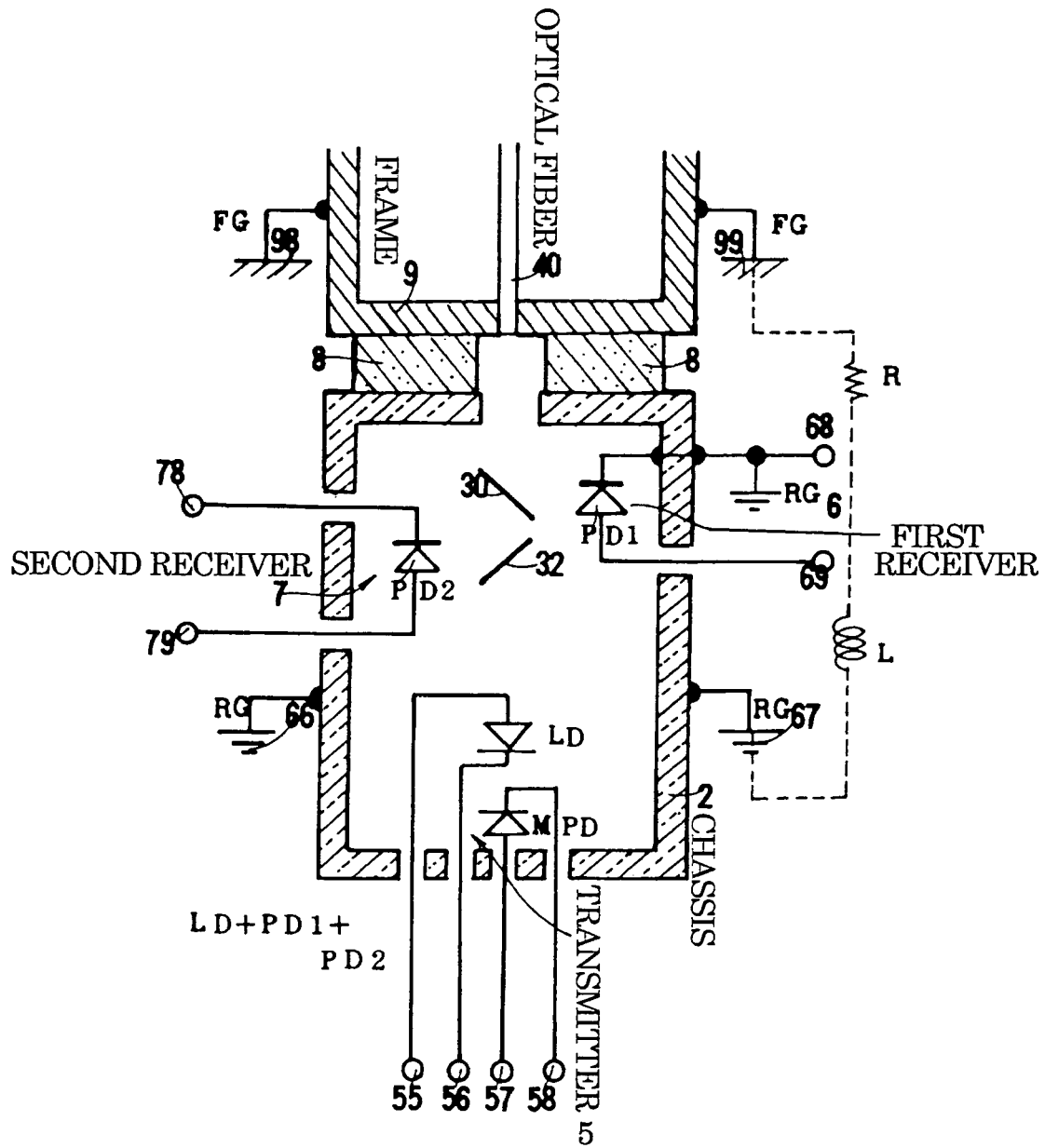
FIG. 5 is a schematic configuration diagram of the interior of a chassis of a receptacle-type single-fiber bidirectional optical module according to the present invention including one laser diode and two photodiodes (i.e., LD+PD1+PD2)
Figure 6:
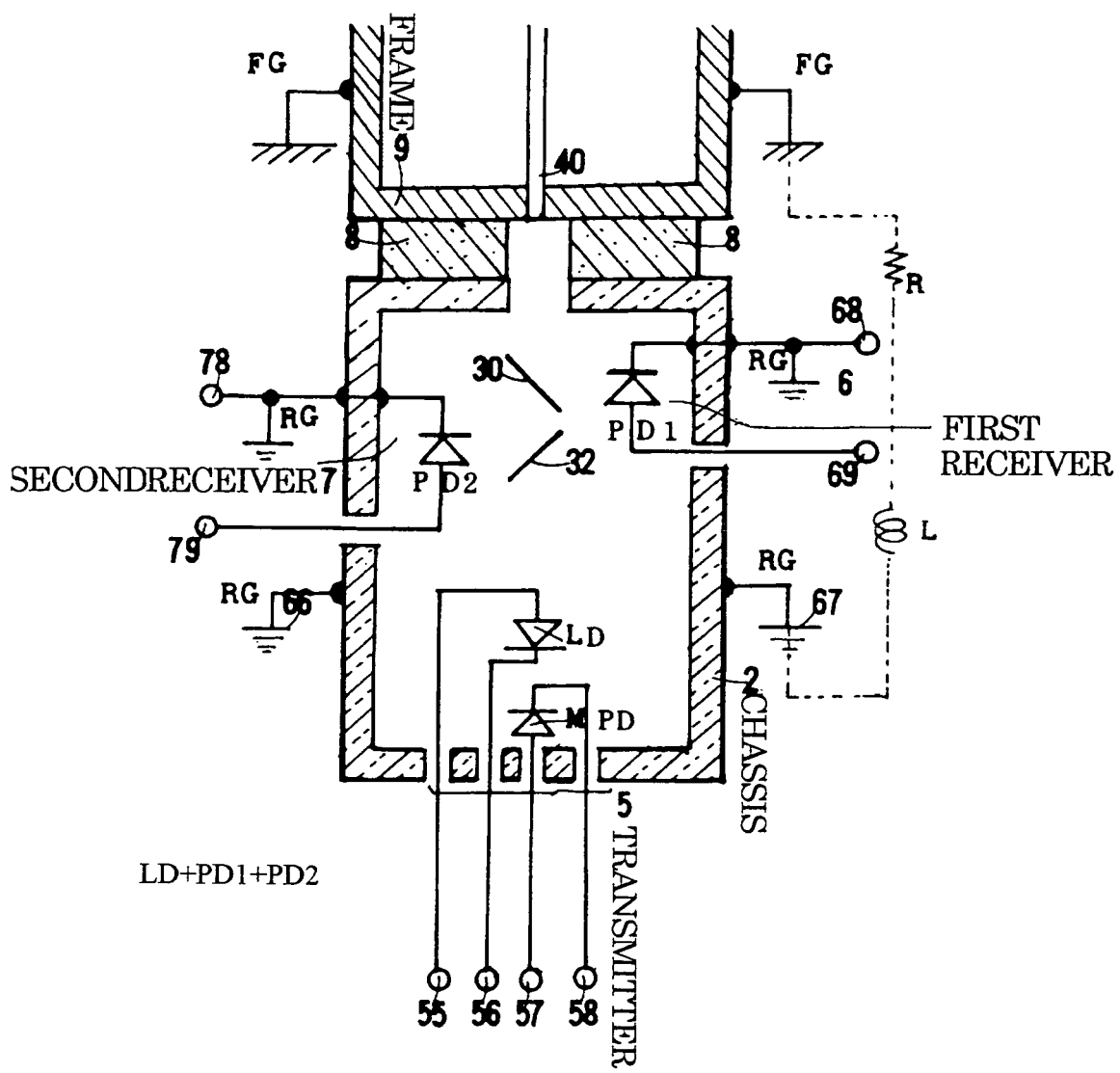
FIG. 6 is a schematic configuration diagram of the interior of a chassis of a receptacle-type single-fiber bidirectional optical module according to the present invention including one laser diode and two photodiodes (i.e., LD+PD1+PD2), in which the cathode of the PD2 is also connected to a receiver ground RG.

The receiver 6 is attached to the side surface of the chassis 2. A disk-shaped PD stem 60, the PD, a lens holder 62, a lens 63, and lead pins 67', 68, and 69 form the receiver 6. The PD is attached to the PD stem 60 directly or via a sub-mount. The anode or the cathode of the PD is connected to the PD stem 60 to supply the receiver ground RG. FIGS. 3, 4, and 5 illustrate the examples in which the cathode of the PD becomes the same in potential as the PD stem 60. When the n-electrode (i.e., the cathode) at the substrate side of the PD is fixed to the PD stem 60, the cathode becomes the same in potential as the PD stem 60 and thus can supply the receiver ground RG. In this case, a front-illuminated type PD is suitable. Alternatively, if the PD is reversed and the p-electrode is fixed to the PD stem 60, the anode becomes the same in potential as the PD stem 60 and thus can supply the receiver ground RG. In this case, a rear-illuminated type PD is suitable. Through the use of the sub-mount, either one of the electrodes of any type of PD can be connected to the receiver ground RG.

The wavelength selective filter 30 has the function of selectively transmitting the light emitted from the LD, guiding the transmitted light to the optical fiber 40, and selectively reflecting the light emitted from the optical fiber 40 to the PD. The wavelength selective filter 30 is provided on the extension line of the optical fiber 40 at an angle of approximately 45°.

The wavelength selective filter 30 is held by a filter holder 20 made of a metal. The filter holder 20 is in a cylindrical shape, and has a lower portion formed into a thin insertion cylinder 22. The inner wall of the insertion cylinder 22 and the outer surface of an upper portion of an LD sleeve 53 are welded and fixed to each other. The filter holder 20 is drilled therein with a stepped through-hole 23 for allowing the passage of the transmission light. The right side of the filter holder 20 is drilled with a circular receiver-side cavity 25, while an upper portion of the filter holder 20 is drilled with a circular receptacle-side cavity 26. Further, a filter attaching surface 24, which is obliquely tilted from the left side to the right side toward the right side of the filter holder 20, is formed across the through-hole 23. The through-hole 23 of the filter attaching surface 24 is fixed with the wavelength selective filter 30.

The cylindrical surface on the side of the filter holder 20 is ground to form a flat PD-side end surface 27. Then, core adjustment is performed to linearly align the wavelength selective filter 30, the lens 63, and the PD, and a top portion of the above-described lens holder 62 of the receiver 6 is fixed to the PD-side end surface 27.

An upper end surface 28 of the filter holder 20 is a flat surface. The positions of the receptacle 4, the through-hole 23, the lens 54, and the LD are aligned in the vertical direction, and the upper end surface 28 is welded and fixed to the above-described inner pipe 42. The filter holder 20 is thus welded to the PD package (i.e., the lens holder 62 and the PD stem 60) and the LD package (i.e., the LD stem 50, the lens holder 51, and the LD sleeve 53) to form the chassis 2. The entirety of the chassis 2 is made of a metal, and the potential of the chassis 2 is equal to the potential of the receiver ground RG.

Figure 9:
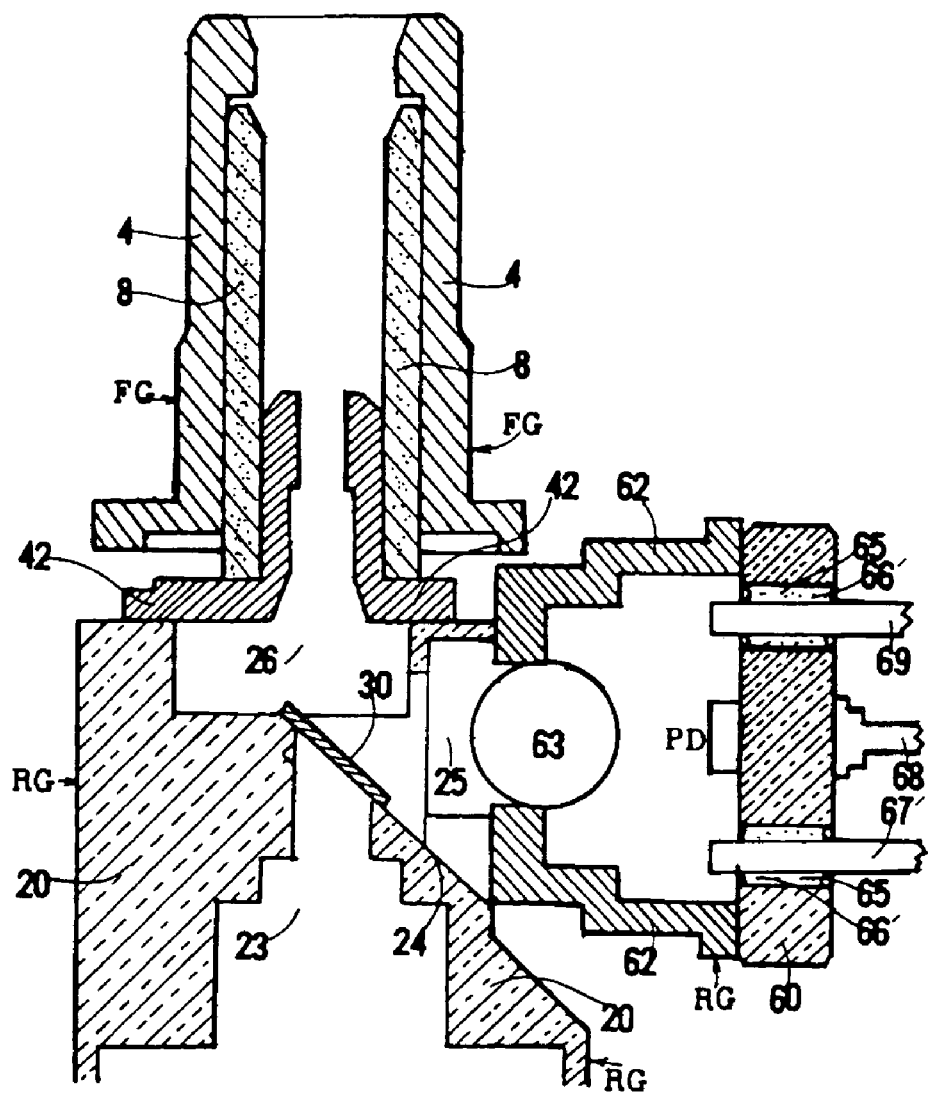
FIG. 9 is an enlarged partial longitudinal front view of the vicinity of a receiver, a wavelength selective filter, a zirconia insulative pipe, and a receptacle of the receptacle-type single-fiber bidirectional optical module according to the embodiment of the present invention including the laser diode and the photodiode (i.e., LD+PD).

FIG. 9 shows an enlarged view of an attached portion of the receptacle 4, the insulative pipe 8, the inner pipe 42, the filter holder 20, and the receiver 6. The receptacle 4 removably holds the ferrule provided at the lending end of the optical fiber 40. In an actual transmission and reception equipment, the frame 9 is provided adjacent to the receptacle 4. Since the receptacle 4 and the filter holder 20 are insulated from each other by the insulative pipe 8, potentials can be arbitrarily supplied to the frame 9 and the filter holder 20. According to the embodiment of the present invention, the chassis 2 is held at the receiver ground RG by connecting the case pin to the cathode pin of the PD. The case pin can be easily connected to the cathode pin of the PD by die-bonding the electrode on the n-type substrate side of the PD to the PD stem 60. Needless to say, it is also possible to connect the case pin to the anode of the PD. Either one of the anode and the cathode of the PD can be connected to the receiver ground RG, depending on the circuit configuration of the receiver 6.

What is claimed is:

1. A single-fiber bidirectional optical module comprising:
    a transmitter including a laser diode for generating transmission light and transmitting the light through an optical fiber;
    a receiver including a light receiving element for receiving reception light transmitted through the optical fiber;
    a wavelength selective filter obliquely provided on an extension line of the light path of the optical fiber for separating the reception light and the transmission light from each other;
    a metal chassis for holding the laser diode, the wavelength selective filter, and the light receiving element;
    a receptacle for removably holding the optical fiber for bidirectionally transmitting the transmission light and the reception light; and
    an insulative member for holding the receptacle to be electrically insulated from the chassis,
    wherein the chassis is held at a receiver ground RG, and the anode and the cathode of the laser diode are insulated from the chassis.

2. The single-fiber bidirectional optical module according to claim 1,
    wherein the chassis includes first and second receivers, and
    wherein either one of the anode and the cathode of the light receiving element in the first receiver is held at the receiver ground RG, and the anode and the cathode of the light receiving element in the second receiver are insulated from the chassis.

3. The single-fiber bidirectional optical module according to claim 1,
    wherein the transmitter includes a monitor photodiode for monitoring the output from the laser diode, and
    wherein the anodes and the cathodes of the laser diode and the monitor photodiode are connected to separate lead pins and insulated from the chassis.

4. The single-fiber bidirectional optical module according to claim 1,
wherein the transmitter includes a monitor photodiode for monitoring the output from the laser diode, and
wherein the anode of the laser diode and the cathode of the monitor photodiode are connected to a single lead pin insulated from the chassis, and the cathode of the laser diode and the anode of the monitor photodiode are insulated from the chassis.

5. The single-fiber bidirectional optical module according to claim 1,
wherein the chassis includes first and second receivers, and
wherein either one of the anode and the cathode of the light receiving element in the first receiver is held at the receiver ground RG and either one of the anode and the cathode of the light receiving element in the second receiver is held at the receiver ground RG.

6. The single-fiber bidirectional optical module according to claim 1,
wherein the insulative member is formed of zirconia (ZrO2).

7. The single-fiber bidirectional optical module according to claim 2,
wherein the insulative member is formed of zirconia (ZrO2).

8. The single-fiber bidirectional optical module according to claim 3,
wherein the insulative member is formed of zirconia (ZrO2).

9. The single-fiber bidirectional optical module according to claim 4,
wherein the insulative member is formed of zirconia (ZrO2).

10. The single-fiber bidirectional optical module according to claim 5,
wherein the insulative member is formed of zirconia (ZrO2).

11. A single-fiber bidirectional optical transmission and reception equipment comprising:
a single-fiber bidirectional optical module including
a laser diode package made of a metal, including therein a laser diode for generating transmission light and a monitor photodiode for monitoring the output from the laser diode, and having lead pins connected to the anodes and the cathodes of the laser diode and the monitor photodiode and insulated from the laser diode package;
a wavelength selective filter for selecting between reception light and the transmission light;
a filter holder made of a metal, formed with a through-hole in the axial direction thereof, holding the wavelength selective filter obliquely with respect to the axial direction, and joined with the laser diode package in the axial direction;
a photodiode package made of a metal, including therein a photodiode for receiving the reception light, having a lead pin directly attached to the photodiode package to be connected to either one of the anode electrode and the cathode electrode of the photodiode and a lead pin insulated from the photodiode package to be connected to the other one of the anode electrode and the cathode electrode of the photodiode, and joined to the filter holder at a side of the wavelength selective filter;
an inner pipe formed with a flange portion fixed to an end surface of the filter holder on the axis line of the filter holder;
an insulative pipe inserted over the outer circumference of the inner pipe; and
a receptacle inserted over the outer circumference of the insulative pipe,
wherein the receptacle is connected to a frame of the optical transmission and reception equipment to be held at a frame ground FG, and a metal chassis including the laser diode package, the photodiode package, and the filter holder is held at a receiver ground RG to doubly surround a transmitter.

12. The single-fiber bidirectional optical transmission and reception equipment according to claim 11,
wherein, in addition to the photodiode, the single-fiber bidirectional optical module includes, at a side of the filter holder, a second photodiode for receiving second reception light, and a second photodiode package including the second photodiode and insulated lead pins, and
wherein the single-fiber bidirectional optical module further includes, inside the filter holder and on an extension of the axis line of an optical fiber, a second wavelength selective filter for selecting between the transmission light and the second reception light.

* * * * *